United States Patent

Grimmer

[15] 3,647,938
[45] Mar. 7, 1972

[54] CONDENSER BUSHING WITH FLEXIBLE CONDUCTOR CONNECTIONS ATTACHED TO THE CONDENSER ELEMENTS

[72] Inventor: Elmer J. Grimmer, Sharpsville, Pa.
[73] Assignee: Westinghouse Electric Corporation, Pittsburgh, Pa.
[22] Filed: Mar. 24, 1971
[21] Appl. No.: 127,653

[52] U.S. Cl. ............................................174/143, 317/260
[51] Int. Cl. ......................................................H01b 17/28
[58] Field of Search....................174/73 R, 142, 143; 29/631; 317/242, 260

[56] References Cited

FOREIGN PATENTS OR APPLICATIONS 692,340   8/1964   Canada..................................174/142

Primary Examiner—Laramie E. Askin
Attorney—A. T. Stratton and F. E. Browder

[57] ABSTRACT

A condenser bushing comprising layers of insulation material wound about a central conductor. Conductive condenser elements or foils are placed between layers of the insulation at properly determined radially spaced intervals throughout the buildup of layers of electrical insulating material. A conductor is attached to the conductor foils or condenser elements when they are placed in position between the layers of electrical insulation. The conductor is wound between the layers of insulation and played along with the insulation at a slight displacement of each turn of the conductor and fed out beyond the last turn of the electrical insulation where the conductor may be connected to an appropriate terminal, such as a ground terminal or potential tap, or to another conductive layer.

3 Claims, 4 Drawing Figures

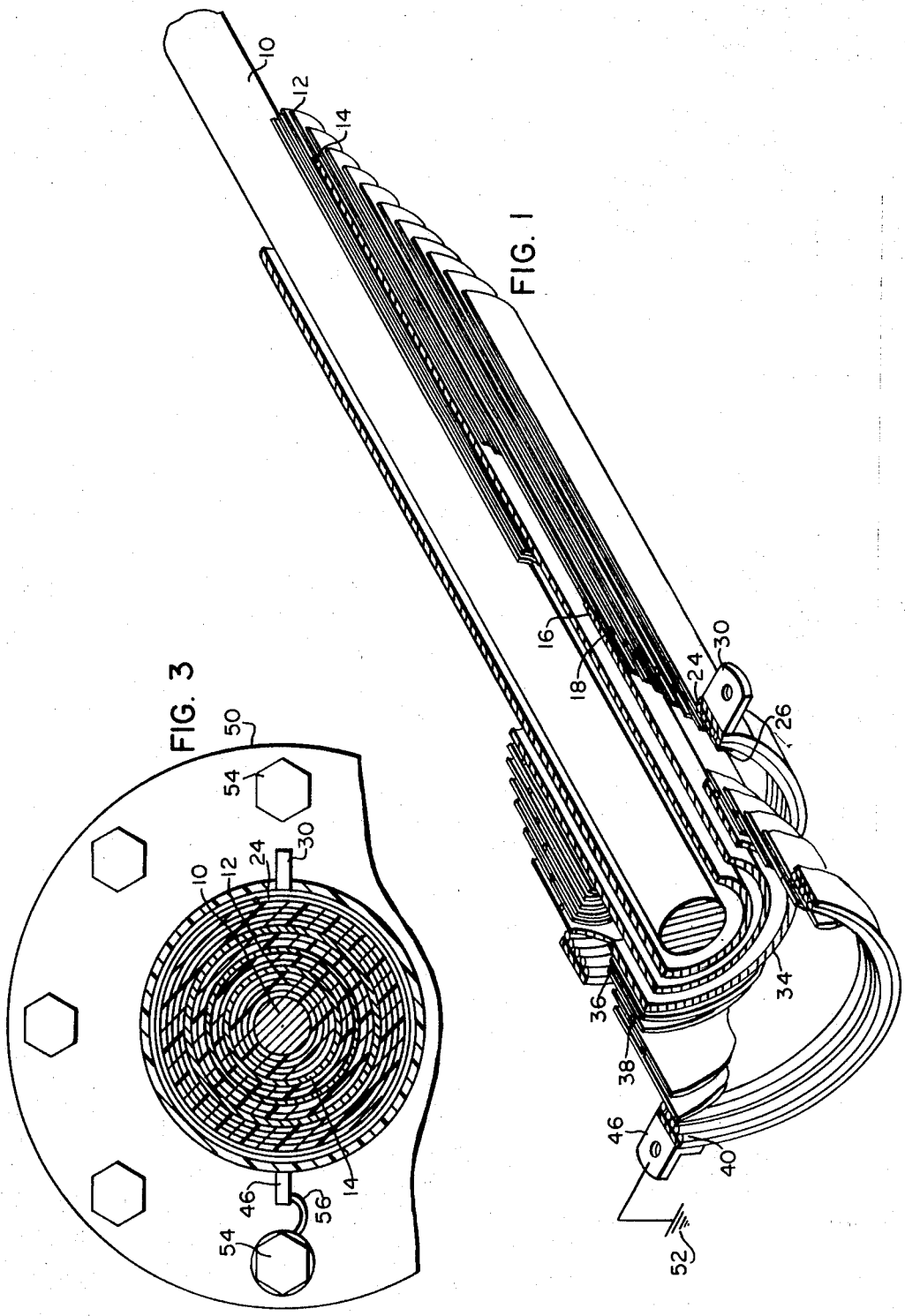

CONDENSER BUSHING WITH FLEXIBLE CONDUCTOR CONNECTIONS ATTACHED TO THE CONDENSER ELEMENTS

BACKGROUND OF THE INVENTION

1. Field of the Invention

This invention relates to condenser bushings of the type provided by winding layers of electrical insulation, such as sheet cellulose material, on a central electrical conductor with conducting condenser elements spaced between layers of the insulation at radially spaced intervals, and more particularly to the method for attaching electrical conductors to the conducting condenser elements and leading the conductors to the outside of the insulation without subsequently cutting the insulation.

2. Description of the Prior Art

In the prior art, it has been the practice to provide condenser bushings by winding layers of sheet insulation, such as cellulose material, on a central conductor until the desired buildup is obtained. Then a condenser element, such as a layer of aluminum foil, or other conductive layer is placed over the insulation buildup, then another buildup of insulation is wound over the conductive condenser element, then another conductive element is placed on the second buildup of electrical insulation and more insulation is wound over this condenser element. This process is repeated until the desired buildup of insulation and radially spaced conductive condenser elements has been obtained. If it is desired to make electrical connections to the conductive condenser elements, the completely wound condenser bushing is placed on a turning lathe and a circumferential groove is cut through the layers of insulation down to the desired conductive condenser element. Then the electrical conductor lead is attached to the conductive condenser element by soldering, clamping, or the like and the flexible electrical conductor is brought to the outside of the insulation where it may be connected to a proper terminal, such as a ground terminal or potential tap. This method of attaching conductor leads to the condenser elements is time consuming and expensive. This method of attaching flexible conductor leads to the condenser elements is also very difficult and tedious because the wound bushing is seldom perfectly round after it has been wound and often this out of round condition of the condenser bushing will permit the cutting tool to cut or perforate the conductive condenser element before the insulation has been removed all the way around the circumference of the condenser bushing. If the conductive condenser element is damaged by the cutting tool, repairing of the damage is an expensive and tedious operation.

This invention eliminates the objection to the prior art by attaching a flexible electrical conductor to the conductive condenser element when the condenser element is placed in position and winding the flexible electrical conductor between adjacent layers of insulation and playing it along with the layers of insulation at a slight displacement of each turn to avoid overlapping of the flexible conductor which would cause excessive buildup of diameter of the condenser bushing. Overlapping of the flexible conductor might also cause electrical breakdown of the insulation between turns of the electrical conductor. The flexible electrical conductor is played along between the adjacent layers of wound insulation material and brought out beyond the last layer of insulation material for connecting to a proper terminal. The invention provided herein eliminates the necessity of placing the wound condenser bushing on a turning lathe to cut a slot for attaching the flexible conductor to the conductive condenser element and also eliminates the possibility of damage to the conductive condenser element with the cutting tool due to the out of round condition of the condenser bushing after it has been completely wound with the desired buildup of layers of sheet insulation with the conductive condenser elements located at radially spaced intervals throughout.

SUMMARY OF THE INVENTION

This invention provides a new and improved method for making connections between the conductive condenser elements of a condenser bushing and a flexible electrical conductor which is brought to the outside of the condenser bushing insulation for connection to a proper terminal, such as a ground terminal or a potential tap.

The condenser bushing is provided by winding layers of sheet insulation, such as cellulose material, or the like, on a central conductor until the desired buildup of insulation is obtained. Then a conductive condenser element, such as a layer of aluminum foil, or other electrical conducting material is placed over the first buildup of electrical insulation. Alternative buildups of insulation and conductive layers are added according to the design of a particular bushing until the conductive condenser element, to which a connection is to be made, is in place. Then a flexible electrical conductor such as a single strand of fine wire, a thin braided conductor, or a thin ribbon or strap with sufficient cross section to carry the charging current of the condenser is attached to the conductive element of the condenser. Then, additional layers of electrical insulation material is wound over the conductive condenser element and the flexible electrical conductor is played along between adjacent layers of the additional insulation material at a slight displacement of each turn of the flexible electrical conductor to avoid overlapping of the electrical conductor and excessive buildup in the diameter of the condenser bushing. This flexible electrical conductor is played along and brought to the outside of the layers of electrical insulation material where it may be connected to a proper tap connection, such as a potential tap or ground connection, or another conductive element of the condenser system of the condenser bushing, as required. This method may be used for making an electrical connection between the conductive elements of the condenser system of the bushing or between a conductive element of the condenser system of the condenser bushing and the central conductor of the central bushing. This invention may be used anywhere it is desired to make an electrical connection between one conducting element and another conducting element which are insulated from each other by turns of sheet insulation.

This invention provides a substantial improvement over the prior art practice, wherein; after the condenser bushing comprising the central conductor and the desired buildup of wound layers of insulation material with the metallic condenser elements radially positioned in the buildup of insulation material has been provided; the wound condenser bushing is then placed on a turning lathe and a circumferential groove is cut in the insulating material down to the conductive condenser element for making the desired electrical connection to the conductive condenser element. The prior art practice is very time consuming in that the condenser bushing must be centered on a turning lathe and the groove very tediously cut down to the desired conductive condenser element without damaging the condenser element. This is very difficult since when the condenser bushing is wound with many layers of sheet insulation with the conductive condenser elements radially spaced therein, the final condenser bushing is often out of round. This out of round condition causes difficulty when the circumferential groove is cut because the cutting tool often damages a portion of the conductive condenser element before all of the insulating material has been removed from the groove. If this should happen, it is a costly operation to repair the conductive condenser element to salvage the bushing. It is also difficult to make the electrical connection between the conductive condenser element at the bottom of the groove and a flexible electrical conductor. The invention provided herein eliminates this objection to the prior art by attaching a flexible electrical conductor to the conductive condenser elements as they are being placed in position and playing the flexible electrical conductor along between adjacent layers of additional electrical insulation material and bringing it out beyond the outermost layer of electrical insulation material for attaching to a proper terminal. In this invention, all of the electrical connections are made to the conductive condenser elements or to the central conductor of the condenser bushing during the winding operation of the condenser bushing, and it is not necessary to have to recenter the bushing on a turning lathe for cutting a groove through the insulation material.

BRIEF DESCRIPTION OF THE DRAWINGS

FIG. 1 is a partial perspective view, with parts broken away, illustrating how the condenser bushing is wound on the central conductor with a flexible electrical conductor attached to the conductive condenser elements and fed out between additional layers of wound insulation material to the outside of the insulation material.

FIG. 3 is a sectional view taken along line III—III of FIG. 2 to illustrate the circular cross section of the condenser bushing.

DESCRIPTION OF THE PREFERRED EMBODIMENT

Figures 2, 4:
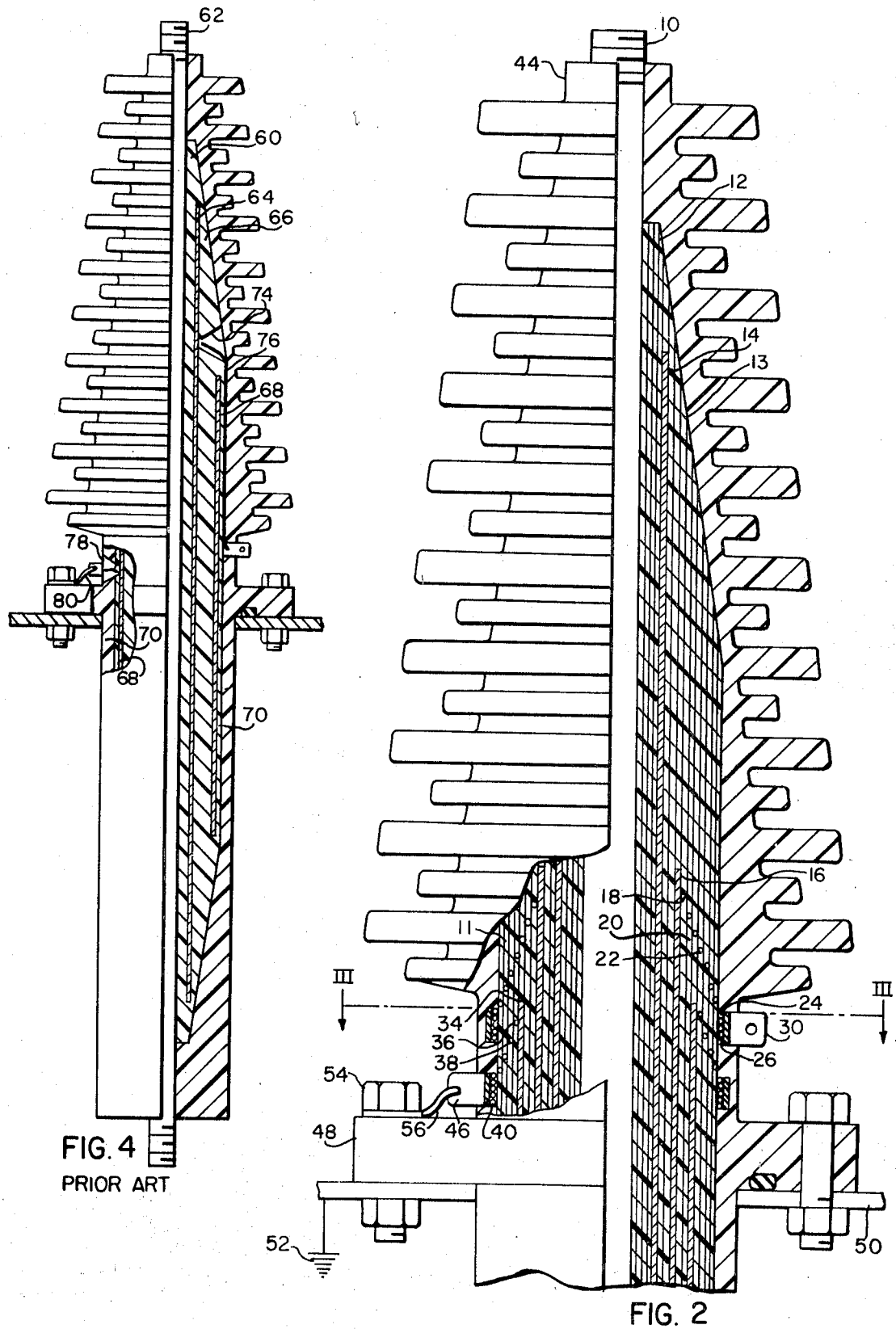
FIG. 2 is an elevational view of a completed condenser bushing provided according to this invention, with parts broken away to illustrate the flexible electrical conductor being brought out from the conductive electrical elements of the condenser to the outside of the insulation for connection to terminals.
FIG. 4 is an elevational view with parts broken away to illustrate how grooves were cut through the insulation down to the conductive condenser elements in the prior art practice to permit making electrical connections to the conductive condenser elements.

Referring to the drawings in detail, specifically to FIG. 1, this figure illustrates how the condenser bushing of this invention is manufactured and a flexible conductor is attached to the conductive condenser elements when they are placed in position on the insulation and how the conductors are brought to the outside of the insulation for attaching to proper terminals. The central conductor element 10 of the condenser bushing is rotated in a turning lathe and a plurality of layers of insulating material 12, such as cellulosic material, or other suitable electrical insulation is wound on the central conductor element 10. After the desired buildup of layers of electrical insulation material 12 has been properly wound on the central conductor 10, a first conductive element 14 of the condenser system is placed over the layers 12 of insulation material. The conductive element 14 may be metallic foil, such as aluminum foil, or other satisfactory conducting material. After the conductive element 14 has been properly positioned on the layers 12 of insulation, additional layers 13 of insulation are wound over the conductive element 14. There a second conductive element 16 is placed in position over the layers of insulation 13. After the second conductive element 16 has been placed in position on the layer 13 the end of a flexible conductor 18 is attached to the conductive condenser element 16 by means of soldering, a proper clamp, or the like. Then additional layers 20 of insulation material are wound over the conductive condenser element 16, and as the layers 20 are wound the flexible electrical conductor, which is attached at 18, is fed along between adjacent layers of the insulation 20 at a slight displacement of each time, as indicated by the reference characters 22, until the flexible electrical conductor is brought outside the insulation material as indicated at 24. The electrical conductor element 18 may then be wound around the entire insulation structure as indicated by the turns 26 for a few turns and the turns 26 are then firmly attached by means of a clamp 30. As illustrated in FIG. 1, the conductor 18 may make several turns 26 around the insulation structure for providing a good surface for making electrical contact with the clamp 30. In condenser bushings of this type, the condenser system is often comprised of a plurality of conductive condenser elements. In FIG. 1 the condenser system comprises a third conductive condenser element 34 radially spaced from the second electrical condenser element 16. The condenser elements 16 and 34 are separated by layers of electrical insulation material, such as the layers 12 and 13. After the condenser element 34 has been properly positioned additional layers of sheet insulation, such as 11, are wound over the conductive condenser element 34. A flexible electrical conductor is attached to the conductive condenser element 34 at a point 36 and wound between adjacent additional layers 11 of the electrical insulation material as indicated by the reference characters 38 and brought outside of the insulation system at 40 for connecting to a proper terminal, such as a ground connection or a potential tap 46. The flexible electrical conductor 36 is brought from the conductive condenser element 34 to the outside of the insulation system in the identical manner that the electrical conductor 18 is brought to the outside of the insulation structure comprising a plurality of layers of insulation material 13.

After the condenser bushing, comprising the central conductor 12 with the insulation system and the condenser system wound thereon and with the flexible electrical conductors 18 and 36 attached respectively to the metallic conductive member 16 and 34, has been fabricated, it is placed in an insulating housing illustrated in FIG. 2 at 44. The connection is made through the housing 44 to the terminal 30 for making an electrical connection through the terminal 30 and the flexible conductor 18 to the conductive condenser element 16. Electrical connection is also made from the conductive condenser element 34 through the flexible conductor 36 to a terminal 46 on the outside of the housing 44. As seen in FIG. 2, the bushing housing 44 is provided with a flange 48 for mounting the bushing on a metallic housing 50. The terminal 46 is shown grounded at 52 through the metallic housing 50 by means of a bolt 54 and conductor 56. The terminal 30 may be utilized as a potential tap for obtaining a potential from the metallic condenser element 34.

From the foregoing description, taken in connection with the drawings, it is seen that this invention has provided an economical and improved means for attaching flexible conductors to the conductive condenser elements of a condenser bushing wherein the conductors may be fed to the outside of the insulation system between the adjacent layers of the wound insulation system. This construction does not require any recentering of the bushing on a turning lathe, after the bushing comprising the central stud and the insulation system and the condenser system have been fabricated, for cutting grooves through the insulation system to attach flexible conductors to the conductive elements of the condenser system as has been the practice in the prior art.

FIG. 4 illustrates the prior art practice wherein the condenser bushing is provided by providing a buildup of insulation 60 on a central stud or conductor 62 then providing a conductive condenser element 64 around the first buildup of insulation 60 then providing another buildup of insulation 66 and finally providing a second conductive condenser element 68 on the second buildup of insulation material 66 and finally providing a third buildup of electrical insulation 70 on top of the second conductive condenser element 68. In the prior art, after the condenser bushing comprising the central stud and the insulation system with the conductive condenser elements 64 and 68 positioned therein has been assembled, then the bushing is centered on a turning lathe and a cutting tool is used to cut a circumferential groove, such as illustrated at 74, for attaching the flexible electrical conductor 76 to the conductive condenser element 64. In addition, a groove which is also usually circumferential, such as illustrated by the reference character 78, is cut through the outer buildup 70 of electrical insulation to attach a flexible electrical conductor 80 to the outer conductive condenser element 68. As pointed out hereinbefore, this prior art method of attaching the flexible conductors 76 and 80 to the conductive condenser elements 64 and 68 was time consuming and expensive because the condenser bushing has to be recentered on a turning lathe after the fabrication of the bushing had been completed for the purpose of cutting the grooves 74 and 78 down to the conductive condenser elements 64 and 68 for attaching the flexible conductors. As also pointed out hereinbefore, this prior art practice also sometimes damaged the conductive condenser elements, because the assembly was often out of round and the cutting tool damaged the conductive condenser element before all of the insulation had been completely removed. The invention provided herein eliminates these objections to the prior art and permits a less expensive and very efficient connection to be made to the conductive condenser elements of the bushing.

Although the invention has been shown and described for making a connection from a conductive condenser element to an outside terminal, it is to be understood that the principle of the invention may be used to make an electrical connection between any two or more conductive elements, such as two conductive elements of the condenser system, a condenser element and the central stud of the bushing, or a conductive element of the condenser system and a terminal externally of the bushing.

I claim as my invention:

1. A condenser bushing comprising a central conductor, layers of insulation material wound spirally around said central conductor, a condenser system comprising at least one conductive condenser element adjacent said first layers of electrical insulation, a flexible electrical conductor attached to said conductive condenser element, second layers of insulation material wound over said conductive condenser element, said flexible electrical conductor being wound between adjacent layers of said second layers of electrical insulation and fed along between adjacent layers of said second layers of electrical insulation to make electrical connection between said condenser element and another conductive element.

2. The condenser bushing of claim 1 comprising a condenser system comprising a plurality of radially spaced conductive condenser elements with a flexible electrical conductor attached to each condenser element and wound between second layers of insulation and fed to the outside of said second layers of insulation.

3. The condenser bushing of claim 1 wherein turns of said flexible electrical conductor are fed between adjacent layers of said second layers of insulation with a displacement between turns of said flexible electrical conductor to prevent buildup due to the turns of said flexible electrical conductor overlapping and to prevent electrical failure of the insulation between turns of said flexible electrical conductor.

* * * * *